United States Patent
Gong

(10) Patent No.: US 10,632,379 B2
(45) Date of Patent: Apr. 28, 2020

(54) METHOD AND APPARATUS FOR PERFORMING INTERACTION IN CHESSBOARD INTERFACE

(71) Applicant: TENCENT TECHNOLOGY (SHENZHEN) COMPANY LIMITED, Shenzhen (CN)

(72) Inventor: Zhuo Gong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 937 days.

(21) Appl. No.: 15/229,719

(22) Filed: Aug. 5, 2016

(65) Prior Publication Data
US 2016/0339340 A1    Nov. 24, 2016

Related U.S. Application Data

(63) Continuation of application No. PCT/CN2015/082142, filed on Jun. 24, 2015.

(30) Foreign Application Priority Data

Jun. 24, 2014   (CN) .......................... 2014 1 0289503

(51) Int. Cl.
*A63F 9/24* (2006.01)
*A63F 13/426* (2014.01)
(Continued)

(52) U.S. Cl.
CPC ........ *A63F 13/426* (2014.09); *A63F 3/00643* (2013.01); *A63F 3/02* (2013.01);
(Continued)

(58) Field of Classification Search
CPC ........... A63F 13/426; A63F 3/02; A63F 13/56
See application file for complete search history.

(56) References Cited

U.S. PATENT DOCUMENTS 9,934,782 B2 *  4/2018  Zohar ..................... G10L 15/22
10,146,785 B2 * 12/2018  Desineni ............ G06F 16/1748
(Continued)

FOREIGN PATENT DOCUMENTS

CN       101380515 A       3/2009
CN       102542165 A       7/2012
(Continued)

OTHER PUBLICATIONS

Nielson, Ryan. Making a Target Tracking Orthographic Camera in Unity. Nielson.io. Online. Mar. 30, 2014. Accessed via the Internet. Accessed Aug. 17, 2019. <URL: https://nielson.io/2014/03/making-a-target-tracking-orthographic-camera-in-unity> (Year: 2014).*
(Continued)

*Primary Examiner* — Dmitry Suhol
*Assistant Examiner* — Carl V Larsen
(74) *Attorney, Agent, or Firm* — Anova Law Group, PLLC

(57) ABSTRACT

A method for performing interaction in a chessboard interface includes: detecting an operation of triggering a chessboard interface to select an interaction area; locating a square in which the operation is located; determining a first movement amount of the square, where the first movement amount is obtained by counting movement operations of a user performed on squares in the chessboard interface; and magnifying the chessboard interface according to the first movement amount.

13 Claims, 9 Drawing Sheets

(51) Int. Cl.
*A63F 13/56* (2014.01)
*A63F 13/2145* (2014.01)
*A63F 3/00* (2006.01)
*A63F 3/02* (2006.01)

(52) U.S. Cl.
CPC .......... *A63F 13/2145* (2014.09); *A63F 13/56* (2014.09); *A63F 2003/00996* (2013.01); *A63F 2300/206* (2013.01)

(56) References Cited

U.S. PATENT DOCUMENTS

| | | | | |
|---|---|---|---|---|
| 2015/0178348 | A1* | 6/2015 | Rohde | G06F 16/2379 707/734 |
| 2016/0291827 | A1* | 10/2016 | Ionita | A63F 13/23 |
| 2017/0302719 | A1* | 10/2017 | Chen | H04L 65/4069 |

FOREIGN PATENT DOCUMENTS

| | | |
|---|---|---|
| CN | 102886138 A | 1/2013 |
| JP | H0751430 A | 2/1995 |
| TW | 201127464 A1 | 8/2011 |

OTHER PUBLICATIONS

Fire Emblem Awakening. Wikipedia.org. Online. Accessed via the the Internet. Accessed Aug. 17, 2019. <URL: https://en.wikipedia.org/wiki/Fire_Emblem_Awakening> (Year: 2019).*

Fire Emblem Awakening—Battle Time! Youtube.com. Online. Jan. 15, 2013. Accessed via the Internet. Accessed Aug. 17, 2019. <URL: https://www.youtube.conn/watch?v=-6rOUFEeFKU> (Year: 2013).*

Manual 3DS Fire Emblem Awakening. Nintendo.com. Online. 2013. Accessed via the Internet. Accessed Aug. 17, 2019. <URL: https://www.nintendo.com/consumer/downloads/manual-3DS-fire-emblem-awakening-en.pdf> (Year: 2013).*

The World Intellectul Property Organization (WIPO) International Search Report for PCT/CN2015/082142 dated Sep. 21, 2015 pp. 1-4.

* cited by examiner

METHOD AND APPARATUS FOR PERFORMING INTERACTION IN CHESSBOARD INTERFACE

CROSS-REFERENCES TO RELATED APPLICATIONS

This application is a continuation application of PCT Patent Application No. PCT/CN2015/082142, filed on Jun. 24, 2015, which claims priority to Chinese Patent Application No. 201410289503.5, entitled "METHOD AND APPARATUS FOR PERFORMING INTERACTION IN CHESSBOARD INTERFACE" filed on Jun. 24, 2014, the entire contents of both of which are incorporated herein by reference.

FIELD OF THE TECHNOLOGY

The present disclosure relates to interactive application technologies, and in particular, to a method and an apparatus for performing interaction in a chessboard interface.

BACKGROUND OF THE DISCLOSURE

With the development of mobile Internet technologies, users can entertain themselves in various manners at all times and places by using various mobile devices such as a mobile phone. For example, a user often uses a mobile phone to play all kinds of board games, so as to perform various interactions by using chessboard interfaces provided by the board games.

However, when a user triggers an operation such as a chess piece placing operation by using a chessboard interface, because an operating area provided by the chessboard interface to the user is excessively small due to limitation to a size of a screen of a mobile device for displaying the chessboard interface, occurrence of a misoperation is caused, so that the chessboard interface has a limitation of being hard to adapt to a mobile device.

SUMMARY

A method for performing interaction in a chessboard interface includes: detecting an operation of triggering a chessboard interface to select an interaction area; locating a square in which the operation is located; determining a first movement amount of the square, the first movement amount being associated with movement operations of a user performed on squares in the chessboard interface; and magnifying the chessboard interface according to the first movement amount.

An apparatus for performing interaction in a chessboard interface includes: a selection operation detection module, configured to detect an operation of triggering a chessboard interface to select an interaction area; a locating module, configured to locate a square in which the operation is located; a movement amount acquiring module, configured to determine a first movement amount of the square, the first movement amount being associated with movement operations of a user performed on squares in the chessboard interface; and a magnification module, configured to magnify the chessboard interface according to the first movement amount.

Other aspects of the present disclosure can be understood by those skilled in the art in light of the description, the claims, and the drawings of the present disclosure.

DESCRIPTION OF EMBODIMENTS

In order to make the objectives, technical solutions, and advantages of the present disclosure more comprehensible, the present disclosure is described in further detail below with reference to the accompanying drawings and the embodiments. It should be understood that specific embodiments described herein are merely used for explaining the present disclosure, but are not intended to limit the present disclosure.

The method as disclosed as following may be implemented by any appropriate computing device having one or more processors and a memory. The computing device, used herein, may refer to any appropriate device with certain computing capabilities (for example, performing interaction in a chessboard interface), such as a personal computer (PC), a work station computer, a hand-held computing device (tablet), a mobile terminal (a mobile phone or a smart phone), a server, a network server, a smart terminal, or any other user-side or server-side computing device. The memory includes a storage medium, which may further include memory modules, for example, a read-only memory (ROM), a random access memory (RAM), and flash memory modules, and mass storages, for example, CD-ROM, U-disk, removable hard disk, and the like, which are all non-transitory storage media. The storage medium may store computer programs for implementing various processes, when being executed by the processors.

Figure 1:
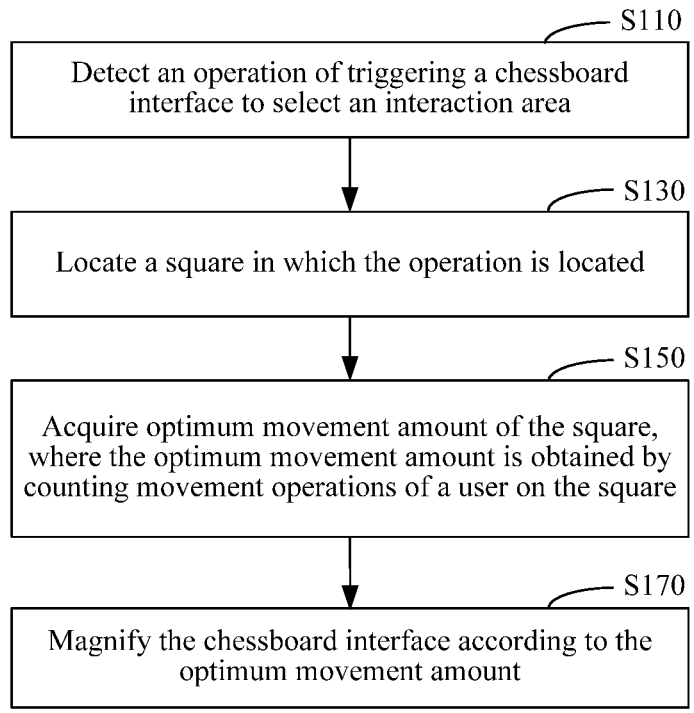
FIG. 1 is a flowchart of a method for performing interaction in a chessboard interface in an embodiment.

In an embodiment, as shown in FIG. 1, a method for performing interaction in a chessboard interface includes the following steps.

Step 110: Obtaining, by listening, an operation of triggering a chessboard interface to select an interaction area. Listening to an operation, as used herein, may refer to detecting the operation performed by the user in the chessboard application. The operation performed by the user in the chessboard application may include: magnifying an area of the chessboard, moving the magnified chessboard to find a desired area, placing a chess piece on the magnified chessboard, and recovering the magnified chessboard to a normal size. For example, a user may tap a square inside a normal-size chessboard interface for selecting the to-be-magnified interaction area. In response to the tap operation, the chessboard application may display a magnified chessboard having 5×5 squares with the tapped square as the center (e.g., sometimes with a displacement according to an optimum movement amount, for example, using the first left square of the tapped square as the center).

In this embodiment, a chessboard interface is an interface, which is provided by a chessboard application program running in a mobile device, for interacting with a user. A chessboard interface includes several squares, for example, a gobang chessboard (or GO board) interface includes 15×15 squares. An interaction area is any area currently selected in the chessboard interface by a user, and the area is an area in which the user considers that a chess piece may be placed, and includes chess piece placing points expected by the user. In one embodiment, the placing points may be at intersections of the squares. In another embodiment, the placing points may be inside the squares.

Specifically, the operation of triggering the chessboard interface to select the interaction area may be an operation of tapping any area in the chessboard interface by the user, or may be another operation, which may be flexibly set according to a running environment of a mobile device. In one embodiment, in response to the interaction area selection, the chessboard application may magnify an area surrounding the interaction area to provide a clearer view. For example, the chessboard application may magnify a 5×5 area centered by the user-selected square, and present the magnified area for further user operation.

Step 130: Locating a square in which the operation is located.

In this embodiment, after the operation of triggering the chessboard interface to select the interaction area is obtained by detecting, one square, in which the operation is specifically located, in the chessboard interface is located, so as to perceive a chess piece placing point expected by the user.

Specifically, because sizes of the squares included in the chessboard interface are consistent, and the square has a fixed height and width, the square in which the operation is located is determined according to the location of the operation in the chessboard interface and the height and the width of the square. In other words, a location on the chessboard targeted by the operation may be detected, and such location is represented by one square on the chessboard.

Step 150: Acquiring optimum movement amount (e.g., a first movement amount) of the square, where the optimum movement amount is obtained by counting movement operations of a user on the square. In one embodiment, the optimum movement amount may be associated with one or more previous movement operations of the user on squares of a magnified chessboard interface. The user may perform movement operation on the magnified chessboard interface to achieve a desired magnified portion of the chessboard.

The movement amount of the square may refer to, a coordinate change of the square for magnifying a portion of the chessboard. The coordinate change may be affected by a magnification factor and a displacement amount. In one embodiment, when the displacement amount is zero, the magnified chessboard may have the user-selected square as the center. For example, assuming the coordinate of the square at the lower left corner is (0,0) and the coordinate of the square at the upper right corner is (15,15), the user may select a square at (6,7) in step 110. The chessboard after applying the magnification factor and before applying the displacement amount may present 5*5 squares using the square originally at (4,5) as the lower left square (currently at (0,0)) to the square originally at (8,9) as the upper right square (currently at (15, 15)). Assuming the displacement amount is (−0.5, 0) in the original coordinate system with the normal-size chessboard (or (−1.5, 0) in the currently magnified coordinate system), the chessboard magnified according to the movement amount may present the squares from (3.5,5) to (7.5,9) in the normal-size chessboard magnified three times as the original size.

In this embodiment, as the user places a chess piece on a chessboard interface time and time again, a process of magnifying the chessboard interface occurs time and time again. In each process of magnifying the chessboard interface, because a parallax effect of a person and an effect of a size of a finger exist, for example, a deviation between a location, which is tapped by a finger, in a screen and an expected location always exists, after the chessboard is magnified, a deviation between a corresponding tapped point for performing an operation of triggering a model interface to select an interaction area and an expected point of the user exists, the user triggers movement operations on the square, so as to make the magnified chessboard interface move, so that a chess piece is placed at the tapped point.

Based on this, the movement operations, which are performed by the user on the square, in the square are counted, and calculation is performed in combination with the counting that is performed and a set magnification factor, so as to obtain optimum movement amount, which is adaptive to an interaction habit of the user, of the square, which reduces, to the utmost extent, operations of performing fine adjustment again after the user magnifies the chessboard interface. The chessboard application may maintain a variable to store the most updated optimum movement amount, which is used for automatically moving the magnified interaction area in response to a user operation of selecting a square to magnify the surrounding area. Such optimum movement amount may be referred to as the first movement amount.

Step 170: Magnifying the chessboard interface according to the optimum movement amount.

In this embodiment, the square in the chessboard interface is moved according to the optimum movement amount, so as to obtain a magnified chessboard interface. Squares in the magnified chessboard interface are all magnified, which provides a large interaction area for the user to place a chess piece, and greatly optimizes an interaction process in the chessboard interface.

In the foregoing interaction process, operating and controlling a chessboard interface by a user is perceived by detecting an operation of triggering a chessboard interface to select an interaction area, a square in which the operation is located is located, so as to learn a chess piece placing point expected by the user, and the chessboard interface is magnified according to the square in which the chess piece placing point is located, that is, the square obtained through locating, that is, the chessboard interface is magnified according to optimum movement amount obtained through calculation, which provides a large area for a chess piece placing operation of the user, and the chess piece placing operation is not limited by a size of a screen of a mobile device.

In addition, because the used optimum movement amount is obtained according to the movement operations, which are performed by the user on the square, in the square, a habit of the user is fully considered, and when it is convenient for the user to operate, mutual adaptability between the chessboard interface and the user in an interaction process is dynamically improved.

Figure 2:
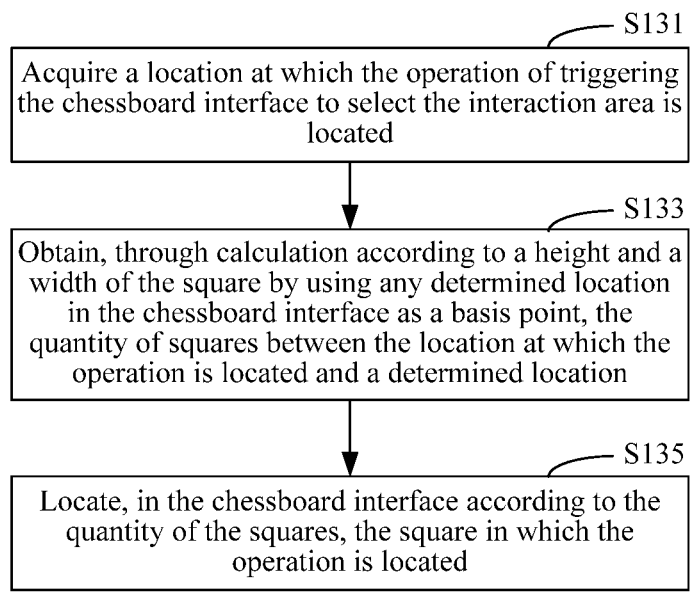
FIG. 2 is a flowchart of a method for locating a square in which an operation is located in FIG. 1.

As shown in FIG. 2, in an embodiment, the foregoing step 130 may further include the following steps.

Step 131: Acquiring a location at which the operation of triggering the chessboard interface to select the interaction area is located.

In this embodiment, the acquired location is expressed in a form of coordinates. Specifically, a coordinate system corresponding to the chessboard interface is established in advance, for example, the lower left corner of the chessboard interface is used as an origin o (0, 0) of coordinates, a direction towards the right is a positive direction of the X axis, a direction upward is a positive direction of the Y axis, widths of edge frames all around the chessboard interface are ignored, and the location that is acquired in the coordinate system and at which the operation of triggering the chessboard interface to select the interaction area is located is touch $(x_a, y_a)$.

Step 133: Obtaining, through calculation according to a height and a width of the square by using any determined location in the chessboard interface as a basis point, the quantity of squares between the location at which the operation is located and a determined location.

In this embodiment, the determined location is any point, whose coordinates are known, in the chessboard interface. In a preferred embodiment, the determined location is the origin of the coordinate system corresponding to the chessboard interface, so as to simplify a calculation process to the utmost extent.

Absolute distances between the location at which the operation is located and the determined location are obtained through calculation by using any determined location as the basis point. The absolute distances include an absolute distance in the X direction and an absolute distance in the Y direction, so that a quotient obtained by performing a division operation on the absolute distance in the X direction and the width of the square is the quantity of squares between the location, at which the operation is located, in the X direction and the determined location.

Accordingly, a quotient obtained by performing a division operation on the absolute distance in the Y direction and the height of the square is the quantity of squares between the location, at which the operation is located, in the Y direction and the determined location.

Specifically, coordinates of the determined location which is used as the basis point are (cx, cy), the height of the square is gh, the width is gk, and coordinates corresponding to the location at which the operation is located are (tx, ty), the quantity, which is obtained through calculation, of the squares between the location, at which the operation is located, in the X direction and the determined location is X=(tx−cx)/gk, and the quantity of the squares between the location, at which the operation is located, in the Y direction and the determined location is Y=(ty−cy)/gh.

In this case, starting to count from the square corresponding to the determined location, an $X^{th}$ square in the horizontal direction and a $Y^{th}$ square in the vertical direction are a square in which the operation obtained through locating is located.

Step 135: Locating, in the chessboard interface according to the quantity of the squares, the square in which the operation is located.

In an embodiment, after the foregoing step 170, the foregoing method further includes: obtaining the movement operations of the user on the square in a magnified chessboard interface, performing, according to the movement operations, fine adjustment on the magnified chessboard interface, and modifying the optimum movement amount according to the movement operations. The movement amount on the magnified chessboard interface according to user-initiated operation may be referred to as the second movement amount.

In this embodiment, because of effects of factors, such as a parallax effect and a size of a finger of a user, the user often performs fine movement on a magnified chessboard interface, so that the chessboard interface adapts to a habit of interacting with the chessboard interface by the user, and modifies the optimum movement amount according to movement operations, so that optimum movement amount used when the chessboard interface is magnified next time is based on the interaction habit of the user in the chessboard interface.

Figure 3:
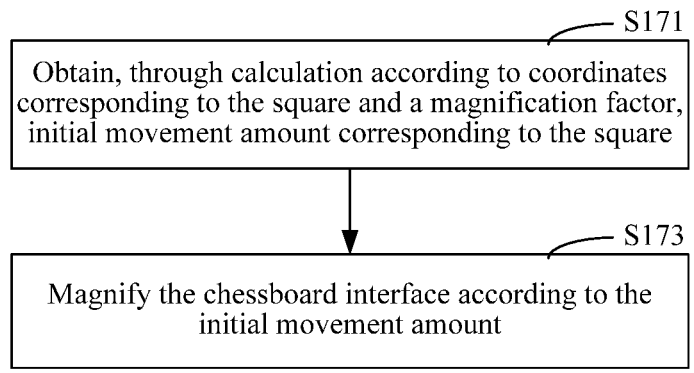
FIG. 3 is a flowchart of a method for magnifying a chessboard interface according to optimum movement amount in an embodiment.

As shown in FIG. 3, in an embodiment, the optimum movement amount is initial movement amount, and the foregoing step 170 may further include the following steps.

Step 171: Obtaining, through calculation according to coordinates corresponding to the square and a magnification factor, initial movement amount corresponding to the square.

In this embodiment, the preset magnification factor and the coordinates corresponding to the square obtained through locating are acquired, and the product of the coordinates and the magnification factor is the initial movement amount corresponding to the square.

Specifically, the sum of the initial movement amount and movement amount for adjusting the square by the user is the corresponding optimum movement amount for currently magnifying the chessboard interface, and the optimum movement amount is used as a corresponding initial value for magnifying the chessboard interface next time. In other words, after adjustment performed by the user, the chessboard application may update the current optimum movement amount (e.g., the first optimum amount) according to the second movement amount, so that the updated first movement amount may be used in next time.

The initial movement amount is obtained through calculation according to the coordinates corresponding to the square and the magnification factor, and includes initial movement amount in the X direction and initial movement amount in the Y direction. Specifically, if a location of the lower left corner of the chessboard interface in a screen of a mobile device is used as an origin, before the chessboard interface is magnified, coordinates corresponding to a point k tapped by the user in the chessboard interface are k (x, y), the point is the location corresponding to the square obtained through locating, and a preset magnification factor is n; therefore, the obtained initial movement amount in the X direction is x−nx, and the initial movement amount in the Y direction is y−ny. The chessboard interface is magnified according to the initial movement amount, which magnifies the chessboard interface and the point tapped by the user is not moved, and both of distances between the locations of the point before and after magnification and the lower left corner of the chessboard interface do not change.

Step 173: Magnifying the chessboard interface according to the initial movement amount.

In this embodiment, in an initial interaction process of the chessboard interface, the chessboard interface is magnified according to the initial movement amount obtained through calculation, so that the magnified chessboard interface is displayed in a screen of a mobile device.

Figure 4:
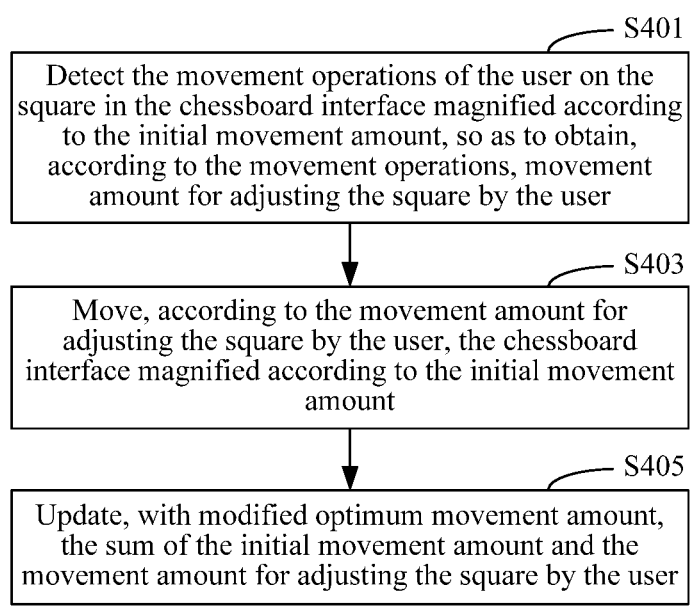
FIG. 4 is a flowchart of a method for detecting movement operations of a user on a square in a magnified chessboard interface, performing, according to the movement operations, fine adjustment on the magnified chessboard interface, and modifying optimum movement amount according to the movement operations in an embodiment.

As shown in FIG. 4, in an embodiment, the step of detecting movement operations of a user on a square in a magnified chessboard interface, performing, according to the movement operations, fine adjustment on the magnified chessboard interface, and modifying optimum movement amount according to the movement operations may further include the following.

Step 401: Detecting the movement operations of the user on the square in the chessboard interface magnified according to the initial movement amount, so as to obtain, according to the movement operations, the movement amount for adjusting the square by the user.

In this embodiment, because of existence of a parallax effect and an effect of a size of a finger of the user, the user moves the magnified chessboard interface, so as to perform fine adjustment on the magnified chessboard interface.

In this case, the movement operations triggered by the user in the magnified chessboard interface are counted, so as to obtain movement amount corresponding to the movement operations, and the movement amount is the movement amount for adjusting the square by the user.

Step 403: Moving, according to the movement amount for adjusting the square by the user, the chessboard interface magnified according to the initial movement amount.

In this embodiment, each square in the currently magnified chessboard interface is moved according to the movement amount for adjusting the square by the user, so as to obtain a chessboard interface that is dynamically adjusted according to the movement operations of the user, and the chessboard interface is displayed in a screen of a mobile device.

Step 405: Updating, with modified optimum movement amount, the sum of the initial movement amount and the movement amount for adjusting the square by the user. In other words, the modified optimum movement amount may equal to the sum of the initial movement amount and the movement amount for adjusting the square by the user.

In this embodiment, the sum of the initial movement amount and the movement amount for adjusting the square by the user is corresponding optimum movement amount for currently magnifying the chessboard interface, and the optimum movement amount is used as a corresponding initial value for magnifying the chessboard interface next time.

Figure 5:
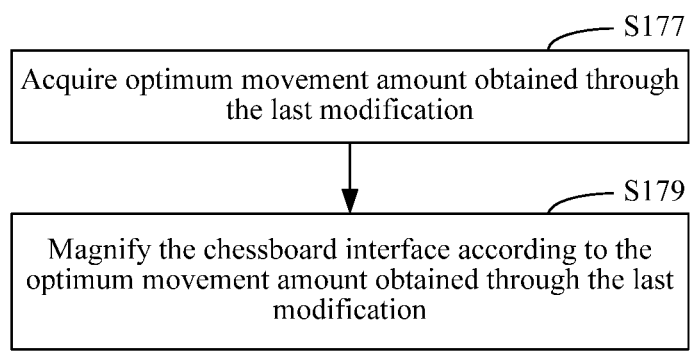
FIG. 5 is a flowchart of a method for magnifying a chessboard interface according to optimum movement amount in another embodiment.

As shown in FIG. 5, in an embodiment, the optimum movement amount is the optimum movement amount obtained through the last modification, and the foregoing step 170 may further include the following.

Step 177: Acquiring optimum movement amount obtained through the last modification.

In this embodiment, the optimum movement amount obtained through the last modification is obtained by counting the movement operations, which occur in the process of magnifying the chessboard interface last time and before the chessboard interface is magnified last time, of the user on the magnified chessboard interface.

Step 179: Magnifying the chessboard interface according to the optimum movement amount obtained through the last modification.

In this embodiment, after the optimum movement amount obtained through the last modification is acquired, the square in the chessboard interface is directly moved according to the optimum movement amount, so as to magnify the chessboard interface in the screen of the mobile device.

In some embodiments, the last modification may not necessarily occur on the same square as the user selected currently. The last modification may be performed on any square on the chessboard that was magnified and later moved by the user.

Figure 6:
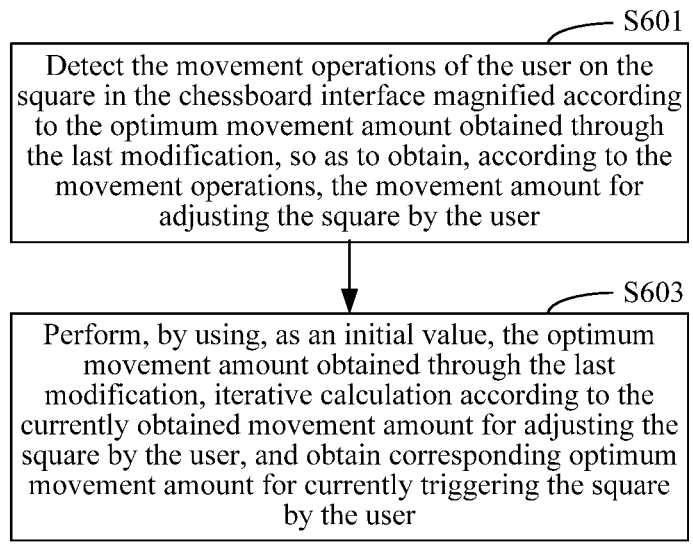
FIG. 6 is a flowchart of a method for detecting movement operations of a user on a square in a magnified chessboard interface, performing, according to the movement operations, fine adjustment on the magnified chessboard interface, and modifying optimum movement amount according to the movement operations in another embodiment.

As shown in FIG. 6, in an embodiment, the step of detecting movement operations of a user on a square in a magnified chessboard interface, performing, according to the movement operations, fine adjustment on the magnified chessboard interface, and modifying optimum movement amount according to the movement operations includes:

Step 601: Detecting the movement operations of the user on the square in the chessboard interface magnified according to the optimum movement amount obtained through the last modification (e.g., the first movement amount), so as to obtain, according to the movement operations, the movement amount for adjusting the square by the user (e.g., the second movement amount).

In this embodiment, after the chessboard interface is magnified according to the optimum movement amount obtained through the last modification, as the user performs movement in the magnified chessboard interface, the movement operations of the user on the square are detected, and then the movement amount for adjusting the square by the user is obtained.

Step 603: Performing, by using, as an initial value, the optimum movement amount obtained through the last modification, iterative calculation according to the currently obtained movement amount for adjusting the square by the user, and obtain corresponding optimum movement amount (e.g., updated first movement amount) for the square currently triggered by the user.

In this embodiment, the optimum movement amount obtained through the last modification is used as the initial value for calculation, that is, iterative calculation is performed by using, as input, the optimum movement amount obtained through the last modification and the movement amount currently obtained by detecting the movement operations of the user on the square. When a square (a, b) is magnified, corresponding optimum movement amount obtained through last calculation is move[a][b]$_i$=($x_i$, $y_i$), and the movement amount, which is currently obtained by detecting the movement operations of the user on the square, for adjusting the square by the user is adjust[a][b]$_i$=($a_i$, $b_i$), a formula used in the iterative calculation is move[a][b]$_i$+adjust[a][b]$_i$=($x_i$+$a_i$, $y_i$+$b_i$).

It can be known from the foregoing description that, in a process of calculating next optimum movement amount, iterative calculation is performed by using move[a][b]$_{i+1}$ as an initial value, where move[a][b]$_{i+1}$=move[a][b]$_i$+adjust[a][b]$_i$.

In another embodiment, the next optimum movement amount (e.g., updated first movement amount) may be determined by the initial movement amount (e.g., the third movement amount) and an average of movement amounts according to previous user operations (e.g., the second movement amount). For example, move[a][b]$_{i+f}$=move[a][b]$_i$+(adjust[a][b]$_i$+adjust[a][b]$_{i+1}$+ . . . +adjust[a][b]$_{i+f-1}$)/(f-1).

It can be known from the foregoing calculation process that, corresponding optimum movement amount, which is obtained in a process of interacting with a chessboard interface by a user, for currently triggering a square by the user is obtained through repeated iterative calculation, and multiple adjustment processes of the user are combined; therefore, as interactions in the chessboard interface are boosted, a magnified chessboard interface is more consistent with a habit of the user, and more effects caused by a parallax effect and a size of a finger of a user are shielded.

A process of iterative calculation on optimum movement amount may be performed as the user interacts in the chessboard interface, or may be performed as a certain quantity of users interacts in the chessboard interface, which is not limited one by one herein, and can be flexibly set according to requirements in an actual operation process.

According to the iterative calculation on optimum movement amount, each chess piece placing point in the chessboard interface corresponds to the optimum movement amount, and habits of most users are met without the need of performing real-time dynamic calculation.

In another embodiment, the foregoing method further includes: detecting the chess piece placing operation triggered in the chessboard interface, and recovering the magnified chessboard interface as the chess piece placing operation is completed.

In this embodiment, in the magnified chessboard interface, the user triggers the chess piece placing operation to an expected chess piece placing point, so as to place a chess piece at the chess piece placing point, and the magnified chessboard interface is recovered as the chess piece is placed, so that the magnified chessboard interface is recovered to an original size.

Figure 7:
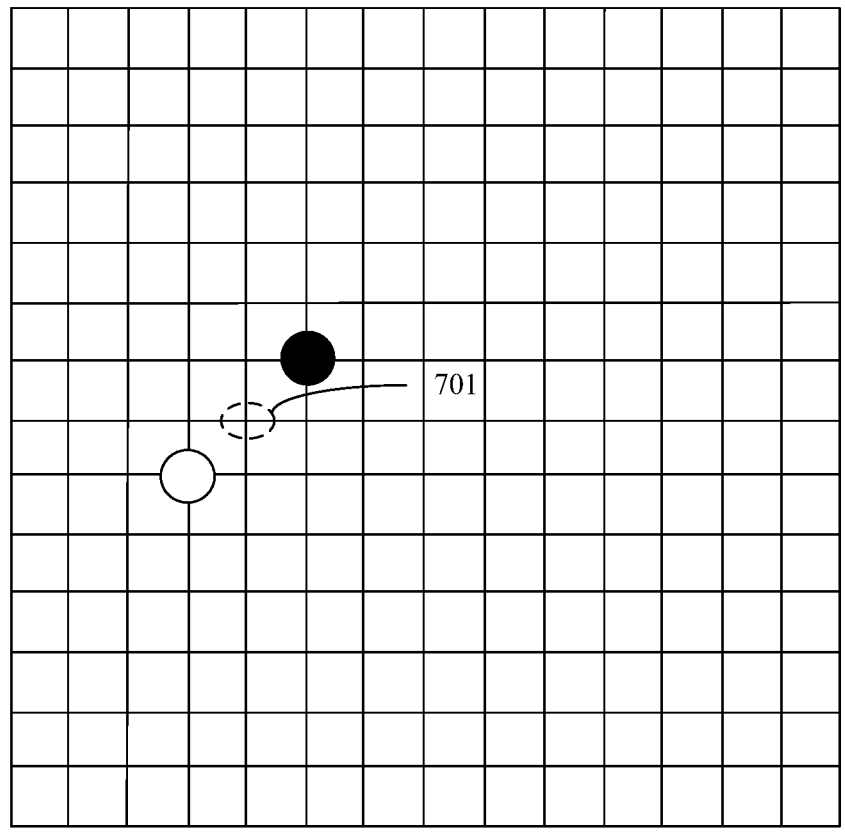
FIG. 7 is a diagram of a chessboard interface before an operation of triggering the chessboard interface to select an interaction area in an embodiment.

The method for performing interaction in a chessboard interface is described below in combination with a specific embodiment. In this embodiment, a gobang chessboard interface is used as an example. As shown in FIG. 7, the chessboard interface is combined by 15×15 horizontal and vertical lines, and has 15×15 cross points, and the cross points are chess piece placing points.

When a user plays chess, the chessboard interface is in a normal size, and after tapping a cross point 710 at an intersection between a back chess piece and a white chess piece in FIG. 7, the chessboard application detects the operation of triggering the chessboard interface to select an interaction area. In this case, a square in which the cross point 710 is located is located, so as to obtain coordinates corresponding to the square.

Figure 8:
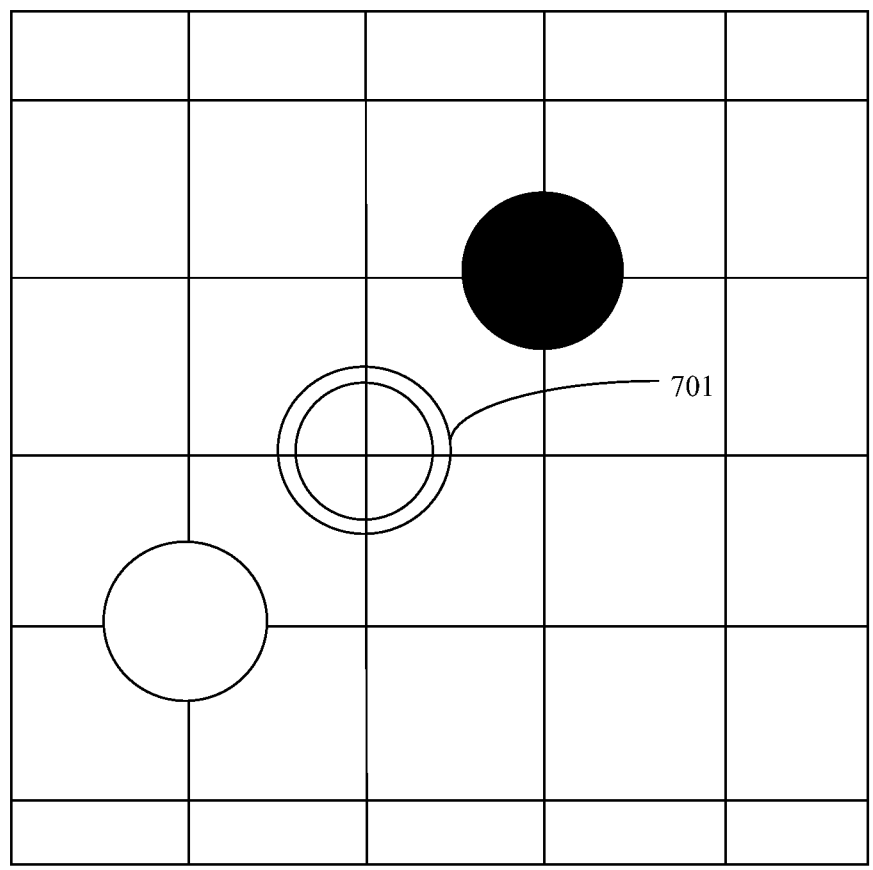
FIG. 8 is a diagram of a magnified chessboard interface in FIG. 7.

If the chessboard interface is used for the first time, optimum movement amount of the chessboard interface is initial movement amount, and the initial movement amount is directly obtained according to the coordinates corresponding to the square and a preset magnification factor, so as to magnify the chessboard interface according to the initial movement amount, that is, obtain a chessboard interface shown in FIG. 8.

In this case, the user may perform fine adjustment on a magnified chessboard interface according to a habit, that is, moving the magnified chessboard interface, movement amount for adjusting the square by the user is obtained, and then the optimum movement amount is modified according to the movement amount, so that the optimum movement amount obtained through modification adapts to the habit of the user.

If the chessboard interface is not used for the first time, optimum movement amount obtained through the last modification is first acquired, and the optimum movement amount is obtained through multiple occurred adjustments of the chessboard interface; therefore, the chessboard interface is magnified according to the optimum movement amount by fully considering a use habit, a parallax effect, and a size of a finger of the user.

In this case, if the user considers that fine adjustment further needs to be performed on the magnified chessboard interface, movement operations may be triggered in the magnified chessboard interface, so that fine adjustment is performed on the magnified chessboard interface according to the movement operations.

Accordingly, the optimum movement amount is also modified again according to the triggered movement operations, so that calculation is not needed when the chessboard interface is magnified next time, and the chessboard interface is directly magnified according to the modified optimum movement amount, which simplifies an implementation process.

As the optimum movement amount is continuously modified, the optimum movement amount is more consistent with use habit of most users, which reduces, to the utmost extent, operations of performing fine adjustment again by the user.

Figure 9:
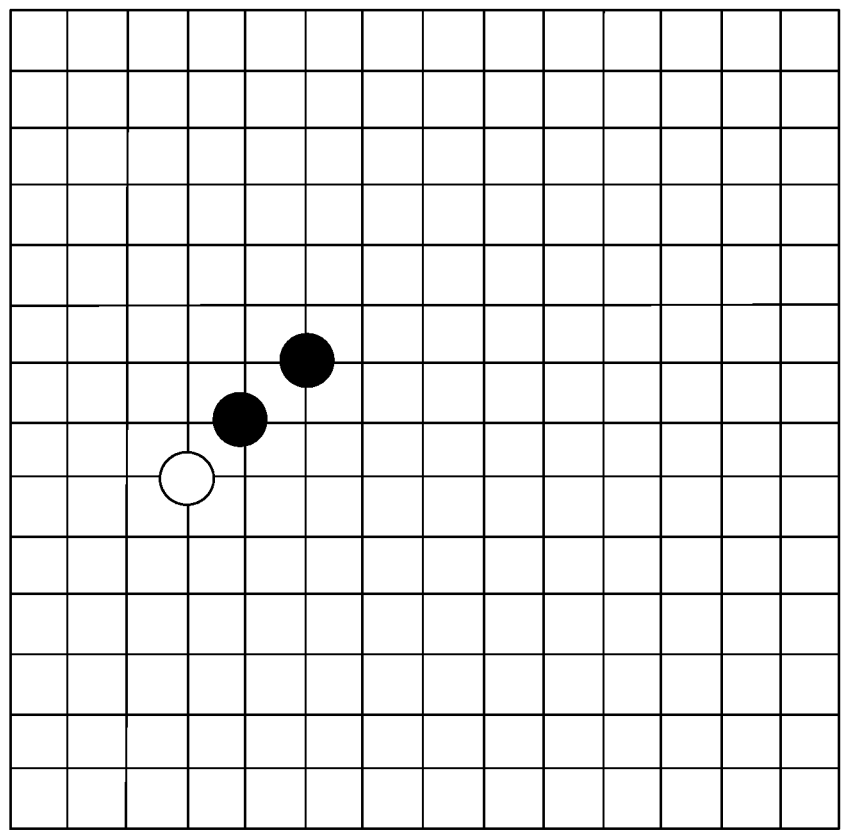
FIG. 9 is a diagram of recovering the magnified chessboard interface in FIG. 8.

After completing a chess piece placing operation of gobang, the user recovers the magnified chessboard interface, as shown in FIG. 9.

Figure 10:
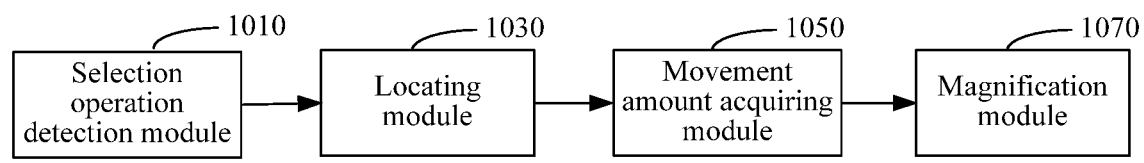
FIG. 10 is a schematic structural diagram of an apparatus for performing interaction in a chessboard interface in an embodiment.

As shown in FIG. 10, in an embodiment, an apparatus for performing interaction in a chessboard interface includes a selection operation detection module 1010, a locating module 1030, a movement amount acquiring module 1050, and a magnification module 1070.

The selection operation detection module 1010 is configured to detect an operation of triggering a chessboard interface to select an interaction area.

In this embodiment, a chessboard interface is an interface, which is provided by a chessboard application program running in a mobile device, for interacting with a user. A chessboard interface includes several squares, for example, a gobang chessboard interface includes 15×15 squares. An interaction area is any area currently selected in the chessboard interface by the user, and the area is an area in which the user considers that a chess piece may be placed, and includes chess piece placing points expected by the user.

Specifically, the operation of triggering the chessboard interface to select the interaction area may be an operation of tapping any area in the chessboard interface by the user, or may be another operation, which may be flexibly set according to a running environment of a mobile device.

The locating module 1030 is configured to locate a square in which the operation is located.

In this embodiment, after the operation of triggering the chessboard interface to select the interaction area is detected, the locating module 1030 locates one square, in which the operation is specifically located, in the chessboard interface, so as to perceive a chess piece placing point expected by the user.

Specifically, because sizes of the squares included in the chessboard interface are consistent, and the square has a fixed height and width, the locating module 1030 determines, according to the location of the operation in the chessboard interface and the height and the width of the square, the square in which the operation is located.

The movement amount acquiring module 1050 is configured to acquire optimum movement amount of the square, where the optimum movement amount is obtained by counting movement operations of the user on the square.

In this embodiment, as the user places a chess piece on a chessboard interface time and time again, a process of magnifying the chessboard interface occurs time and time again. In each process of magnifying the chessboard interface, because a parallax effect of a person and an effect of a size of a finger exist, for example, a deviation between a location, which is tapped by a finger, in a screen and an expected location always exists, after the chessboard is magnified, a deviation between a corresponding tapped point for performing an operation of triggering a model interface to select an interaction area and an expected point of the user exists, the user triggers movement operations on the square, so as to make the chessboard interface move, so that a chess piece is placed at the tapped point.

Based on this, the movement operations, which are performed by the user on the square, in the square are counted, and calculation is performed in combination with the counting that is performed and a set magnification factor, so as to obtain optimum movement amount, which is adaptive to an interaction habit of the user, of the square, which reduces, to the utmost extent, operations of performing fine adjustment again after the user magnifies the chessboard interface.

The magnification module 1070 is configured to magnify the chessboard interface according to the optimum movement amount.

In this embodiment, the magnification module 1070 moves the square in the chessboard interface according to the optimum movement amount, so as to obtain a magnified chessboard interface. Squares in the magnified chessboard interface are all magnified, which provides a large interaction area for the user to place a chess piece, and greatly optimizes an interaction process in the chessboard interface.

In the foregoing interaction process, operating and controlling a chessboard interface by a user is perceived by detecting an operation of triggering a chessboard interface to select an interaction area, a square in which the operation is located is located, so as to learn a chess piece placing point expected by the user, and the chessboard interface is magnified according to the square in which the chess piece placing point is located, that is, the square obtained through locating, that is, the chessboard interface is magnified according to optimum movement amount obtained through calculation, which provides a large area for a chess piece placing operation of the user, and the chess piece placing operation is not limited by a size of a screen of a mobile device.

In addition, because the used optimum movement amount is obtained according to the movement operations, which are performed by the user on the square, in the square, a habit of the user is fully considered, and when it is convenient for the user to operate, mutual adaptability between the chessboard interface and the user in an interaction process is dynamically improved.

Figure 11:
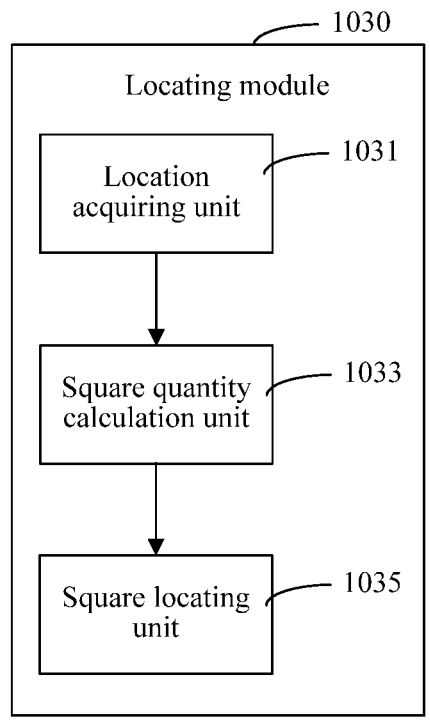
FIG. 11 is a schematic structural diagram of a locating module in FIG. 10.

As shown in FIG. 11, in an embodiment, the foregoing locating module 1030 includes a location acquiring unit 1031, a square quantity calculation unit 1033, and a square locating unit 1035.

The location acquiring unit 1031 is configured to acquire a location at which the operation of triggering the chessboard interface to select the interaction area is located.

In this embodiment, the acquired location is expressed in a form of coordinates. Specifically, a coordinate system corresponding to the chessboard interface is established in advance, for example, the lower left corner of the chessboard interface is used as an origin o (0, 0) of coordinates, a direction towards the right is a positive direction of the X axis, a direction upward is a positive direction of the Y axis, widths of edge frames all around the chessboard interface are ignored, and the location that is acquired in the coordinate system and at which the operation of triggering the chessboard interface to select the interaction area is located is touch (xa, ya).

The square quantity calculation unit 1033 is configured to obtain, through calculation according to a height and a width of the square by using any determined location in the chessboard interface as a basis point, the quantity of squares between the location at which the operation is located and a determined location.

In this embodiment, the determined location is any point, whose coordinates are known, in the chessboard interface. In a preferred embodiment, the determined location is the origin of the coordinate system corresponding to the chessboard interface, so as to simplify a calculation process to the utmost extent.

The square quantity calculation unit 1033 obtains, through calculation by using any determined location as the basis point, absolute distances between the location at which the operation is located and the determined location. The absolute distances include an absolute distance in the X direction and an absolute distance in the Y direction, so that a quotient obtained by performing a division operation on the absolute distance in the X direction and the width of the square is the quantity of squares between the location, at which the operation is located, in the X direction and the determined location.

Accordingly, a quotient obtained by performing, by the square quantity calculation unit 1033, a division operation on the absolute distance in the Y direction and the height of the square is the quantity of squares between the location, at which the operation is located, in the Y direction and the determined location.

Specifically, coordinates of the determined location which is used as the basis point are (cx, cy), the height of the square is gh, the width is gk, and coordinates corresponding to the location at which the operation is located are (tx, ty), the quantity, which is obtained by the square quantity calculation unit 1033 through calculation, of the squares between the location, at which the operation is located, in the X direction and the determined location is $X=(tx-cx)/gk$, and the quantity of the squares between the location, at which the operation is located, in the Y direction and the determined location is $Y=(ty-cy)/gh$.

In this case, the square quantity calculation unit 1033 starts to count from the square corresponding to the determined location, an Xth square in the horizontal direction and a Yth square in the vertical direction are a square in which the operation obtained through locating is located.

The square locating unit 1035 is configured to locate, in the chessboard interface according to the quantity of the squares, the square in which the operation is located.

Figure 12:
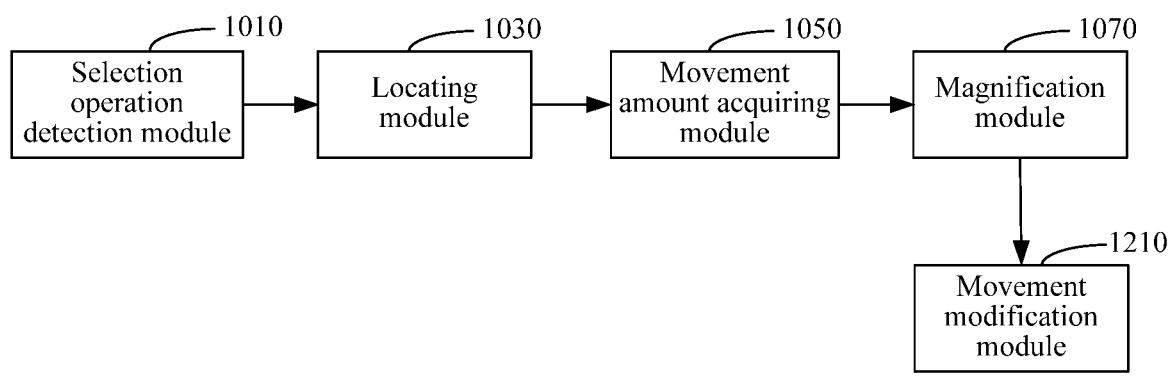
FIG. 12 is a schematic structural diagram of an apparatus for performing interaction in a chessboard interface in another embodiment.

As shown in FIG. 12, in an embodiment, the foregoing apparatus further includes a movement modification module 1210.

The movement modification module 1210 is configured to detect the movement operations of the user on the square in the magnified chessboard interface, perform fine adjustment on the magnified chessboard interface according to the movement operations, and modify the optimum movement amount according to the movement operations.

In this embodiment, because of factors, such as a parallax effect and a size of a finger of a user, the user often performs fine movement on a magnified chessboard interface, so that the chessboard interface adapts to a habit of interacting with the chessboard interface by the user, and the movement modification module 1210 modifies optimum movement amount according to movement operations, so that optimum movement amount used when the chessboard interface is magnified next time is based on the interaction habit of the user in the chessboard interface.

Figure 13:
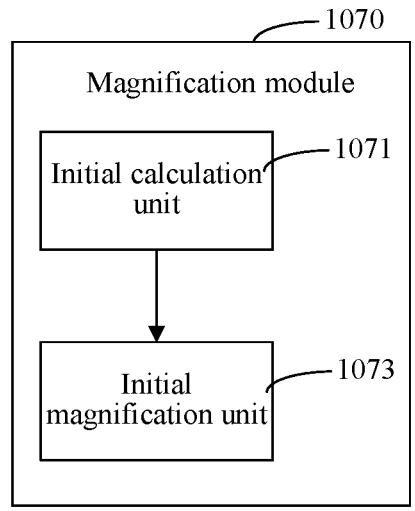
FIG. 13 is a schematic structural diagram of a magnification module in an embodiment.

As shown in FIG. 13, in an embodiment, the optimum movement amount is initial movement amount, and the foregoing magnification module 1070 includes an initial calculation unit 1071 and an initial magnification unit 1073.

The initial calculation unit 1071 is configured to obtain, through calculation according to the coordinates corresponding to the square and the magnification factor, initial movement amount corresponding to the square.

In this embodiment, the initial calculation unit 1071 acquires the preset magnification factor and the coordinates corresponding to the square obtained through locating, where the product of the coordinates and the magnification factor is the initial movement amount corresponding to the square.

Specifically, the sum of the initial movement amount and movement amount for adjusting the square by the user is the corresponding optimum movement amount for currently magnifying the chessboard interface, and the optimum movement amount is used as a corresponding initial value for magnifying the chessboard interface next time.

The initial movement amount is obtained through calculation according to the coordinates corresponding to the square and the magnification factor, and includes initial movement amount in the X direction and initial movement amount in the Y direction. Specifically, if a location of the lower left corner of the chessboard interface in a screen of a mobile device is used as an origin, before the chessboard interface is magnified, coordinates corresponding to a point k tapped by the user in the chessboard interface are k (x, y), the point is the location corresponding to the square obtained through locating, and a preset magnification factor is n; therefore, the obtained initial movement amount in the X direction is x−nx, and the initial movement amount in the Y direction is y−ny. The chessboard interface is magnified according to the initial movement amount, which magnifies the chessboard interface and the point tapped by the user is not moved, and both of distances between the locations of the point before and after magnification and the lower left corner of the chessboard interface do not change.

The initial magnification unit 1073 is configured to move, according to the movement amount for adjusting the square by the user, the chessboard interface magnified according to the initial movement amount.

In this embodiment, in an initial interaction process of the chessboard interface, the initial magnification unit 1073 magnifies the chessboard interface according to the initial movement amount obtained through calculation, so that the magnified chessboard interface is displayed in a screen of a mobile device.

Figure 14:
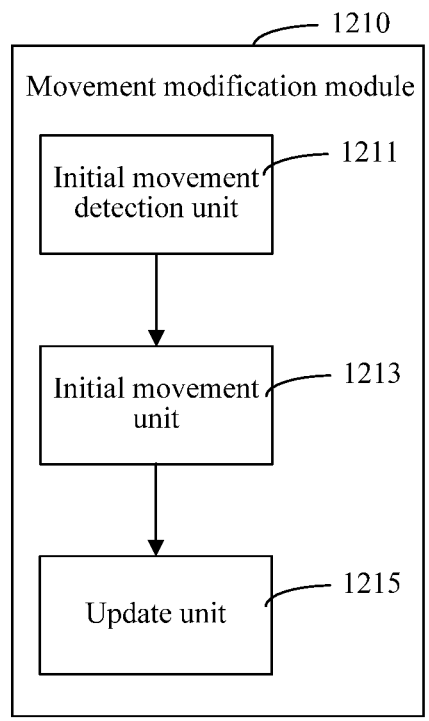
FIG. 14 is a schematic structural diagram of a movement modification module in an embodiment.

As shown in FIG. 14, in an embodiment, the movement modification module 1210 includes an initial movement detection unit 1211, an initial movement unit 1213, and an update unit 1215.

The initial movement detection unit 1211 is configured to move, according to the movement amount for adjusting the square by the user, the chessboard interface magnified according to the initial movement amount.

In this embodiment, because of existence of a parallax effect and an effect of a size of a finger of the user, the user moves the magnified chessboard interface, so as to perform fine adjustment on the magnified chessboard interface.

In this case, the initial movement detection unit 1211 counts the movement operations triggered by the user in the magnified chessboard interface, so as to obtain movement amount corresponding to the movement operations, where the movement amount is the movement amount for adjusting the square by the user.

The initial movement unit 1213 is configured to move, according to the movement amount for adjusting the square by the user, the chessboard interface magnified according to the initial movement amount.

In this embodiment, the initial movement unit 1213 moves each square in the currently magnified chessboard interface according to the movement amount for adjusting the square by the user, so as to obtain a chessboard interface that is dynamically adjusted according to the movement operations of the user, and displays the chessboard interface in a screen of a mobile device.

The update unit 1215 is configured to update, with modified optimum movement amount, the sum of the initial movement amount and the movement amount for adjusting the checker by the user.

In this embodiment, the sum of the initial movement amount and the movement amount for adjusting the square by the user is corresponding optimum movement amount for currently magnifying the chessboard interface, and the optimum movement amount is used as a corresponding initial value for magnifying the chessboard interface next time.

Figure 15:
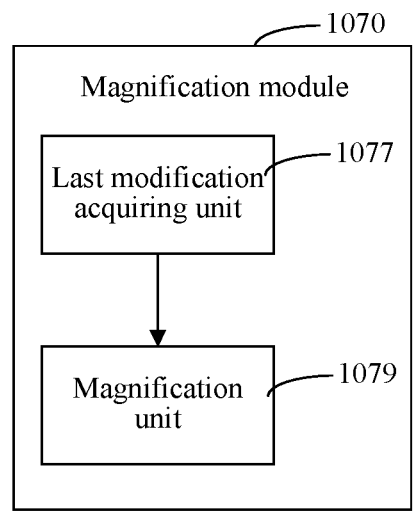
FIG. 15 is a schematic structural diagram of a magnification module in another embodiment.

As shown in FIG. 15, in an embodiment, the optimum movement amount is the optimum movement amount obtained through the last modification, and the foregoing magnification module 1070 includes a last modification acquiring unit 1077 and a magnification unit 1079.

The last modification acquiring unit 1077 is configured to acquire the optimum movement amount obtained through the last modification.

In this embodiment, the optimum movement amount obtained through the last modification is obtained by counting the movement operations, which occur in the process of magnifying the chessboard interface last time and before the chessboard interface is magnified last time, of the user on the magnified chessboard interface.

The magnification unit 1079 is configured to magnify the chessboard interface according to the optimum movement amount obtained through the last modification.

In this embodiment, after the optimum movement amount obtained through the last modification is acquired, the magnification unit 1079 directly moves the square in the chessboard interface according to the optimum movement amount, so as to magnify the chessboard interface in the screen of the mobile device.

Figure 16:
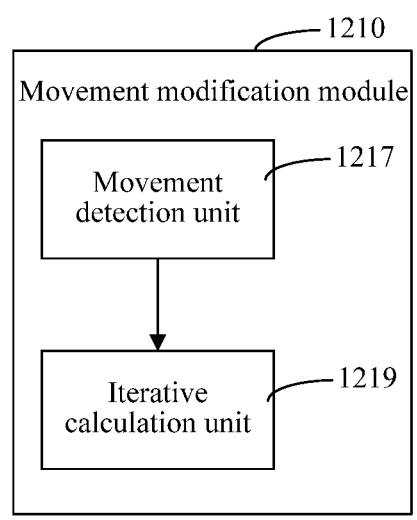
FIG. 16 is a schematic structural diagram of a movement modification module in another embodiment.

As shown in FIG. 16, in an embodiment, the movement modification module 1210 includes a movement detection unit 1217 and an iterative calculation unit 1219.

The movement detection unit 1217 is configured to detect the movement operations of the user on the square in the chessboard interface magnified according to the optimum movement amount obtained through the last modification, so as to obtain, according to the movement operations, the movement amount for adjusting the square by the user.

In this embodiment, after the chessboard interface is magnified according to the optimum movement amount obtained through the last modification, as the user performs movement in the magnified chessboard interface, the movement detection unit 1217 detects the movement operations of the user on the square, and then obtains the movement amount for adjusting the square by the user.

The iterative calculation unit 1219 is configured to perform, by using, as an initial value, the optimum movement amount obtained through the last modification, iterative calculation according to the currently obtained movement amount for adjusting the square by the user, and obtain corresponding optimum movement amount for currently triggering the square by the user.

In this embodiment, the optimum movement amount obtained through the last modification is used as the initial value for calculation, that is, the iterative calculation unit 1219 performs iterative calculation by using, as input, the optimum movement amount obtained through the last modification and the movement amount currently obtained by detecting the movement operations of the user on the square. When a square (a, b) is magnified, corresponding optimum movement amount obtained through last calculation is move$[a][b]_i=(x_i, y_i)$, and the movement amount, which is currently obtained by detecting the movement operations of the user on the square, for adjusting the square by the user is adjust$[a][b]_i=(a_i, b_i)$, a formula used in the iterative calculation performed by the iterative calculation unit 1219 is move$[a][b]_i$+adjust$[a][b]_i=(x_i+a_i, y_i+b_i)$.

It can be known from the foregoing description that, in a process of calculating next optimum movement amount, the iterative calculation unit 1219 performs iterative calculation by using move$[a][b]_{i+1}$ as an initial value, where move$[a][b]_{i+1}$=move$[a][b]_i$+adjust$[a][b]_i$.

It can be known from the foregoing calculation process that, corresponding optimum movement amount, which is obtained in a process of interacting with a chessboard interface by a user, for currently triggering a square by the user is obtained through repeated iterative calculation, and multiple adjustment processes of the user are combined; therefore, as interactions in the chessboard interface are boosted, a magnified chessboard interface is more consistent with a habit of the user, and more effects caused by a parallax effect and a size of a finger of a user are shielded.

A process of iterative calculation on optimum movement amount may be performed as the user interacts in the chessboard interface, or may be performed as a certain quantity of users interacts in the chessboard interface, which is not limited one by one herein, and can be flexibly set according to requirements in an actual operation process.

According to the iterative calculation on optimum movement amount, each chess piece placing point in the chessboard interface corresponds to the optimum movement amount, and habits of most users are met without the need of performing real-time dynamic calculation.

In another embodiment, the foregoing apparatus further includes an interface recovery module. The interface recovery module is configured to listen to the chess piece placing operation triggered in the chessboard interface, and recover the magnified chessboard interface as the chess piece placing operation is completed.

In this embodiment, in the magnified chessboard interface, the user triggers the chess piece placing operation to an expected chess piece placing point, so as to place a chess piece at the chess piece placing point, and the interface recovery module recovers the magnified the chessboard interface as the chess piece is placed, so that the magnified chessboard interface is recovered to an original size.

A person of ordinary skill in the art may understand that, all or some of the processes of the foregoing method embodiments may be implemented by a computer program instructing relevant hardware. The program may be stored in a computer readable storage medium. For example, in the embodiments of the present invention, the program may be stored in a storage medium of a computer system, and is executed by at least one processor in the computer system, so as to implement the processes of the embodiments of the methods. The storage medium may be a magnetic disk, an optical disc, an ROM, or an RAM.

Figure 17:
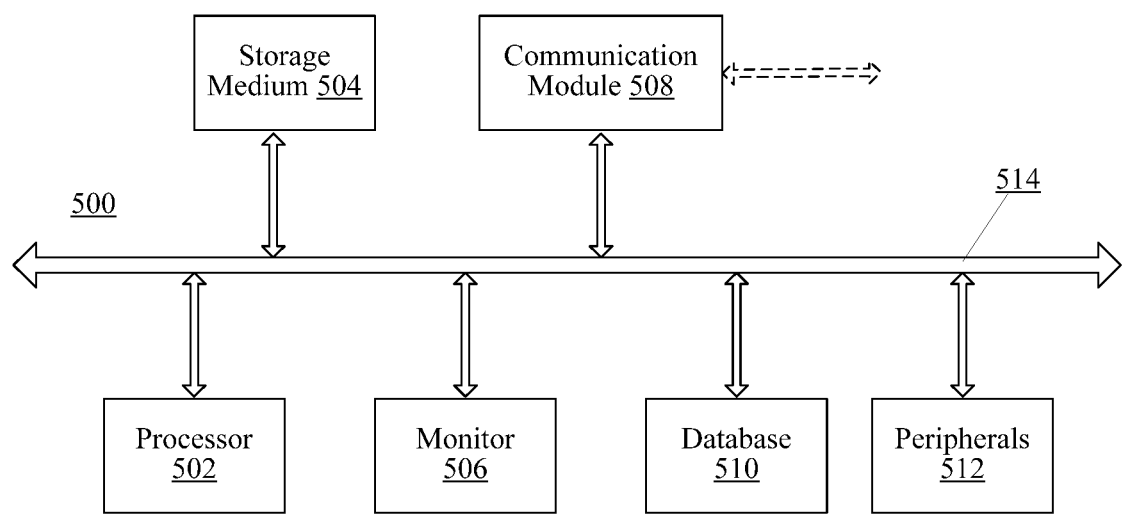
FIG. 17 illustrates a block diagram of an exemplary computer system consistent with the disclosed embodiments.

The disclosed computing device, and/or various disclosed modules and units may be implemented using one or more computing systems. FIG. 17 illustrates an exemplary computing system consistent with the disclosed embodiments.

As shown in FIG. 17, a computing system 500 may include a processor 502, a storage medium 504, a monitor 506, a communication module 508, a database 510, peripherals 512, and one or more bus 514 to couple the devices together. Certain devices may be omitted and other devices may be included.

The processor 502 can include any appropriate processor or processors. Further, the processor 502 can include multiple cores for multi-thread or parallel processing. The storage medium 504 may include memory modules, e.g., Read-Only Memory (ROM), Random Access Memory (RAM), and flash memory modules, and mass storages, e.g., CD-ROM, U-disk, removable hard disk, etc. The storage medium 504 may store computer programs for implementing various processes (e.g., running a board game application, responding to user operations on the chessboard interface, etc.), when executed by the processor 502.

The monitor 506 may include display devices for displaying contents in the computing system 500, such as displaying, on a software interface, a magnified chessboard interface according to user input by implementing the disclosed method. The peripherals 512 may include I/O devices, e.g., touchscreen, keyboard and mouse for inputting information by a user. The peripherals may also include certain sensors, such as camera, speaker, microphone, etc.

Further, the communication module 508 may include network devices for establishing connections through a communication network such as Internet or other types of computer networks or telecommunication networks, either wired or wireless. The database 510 may include one or more databases for storing certain data (e.g., board game rules, optimum movement amount, etc.) and for performing certain operations on the stored data.

In operation, the computing system 500 may receive a user operation on the chessboard interface by the mouse or touch screen 512 or transmitted from another device through the communication module 508, implement the disclosed method to process the user operation and perform corresponding operations on the chessboard interface by the processor 502, and display the process result on the monitor 506. Specifically, the computing system 500 may detect an operation of triggering a chessboard interface to select an interaction area; locate a square in which the operation is located; acquire an optimum movement amount of the square, the optimum movement amount being obtained by counting movement operations of a user on the square; and magnify the chessboard interface according to the optimum movement amount.

The disclosed method and system may be applied in various graphical applications that involve magnifying a selected portion of an interface based on a user selection and adjusting the magnified portion based on user operation. The disclosed method may be implemented to record the movement amount on the magnified portion performed by the user, and automatically apply the movement amount to a to-be-magnified portion in a next operation.

The foregoing embodiments only express several implementation manners of the present disclosure, and the descriptions thereof are specific and detailed, which therefore shall not be considered as a limitation of the scope of the present disclosure. It should be noted that, a person of ordinary skill in the art may further make several modifications and improvements without departing from the idea of the present disclosure, and such modifications and improvements shall all fall within the protection scope of the present disclosure. Therefore, the protection scope of the present disclosure shall be subject to the appended claims.

What is claimed is:

1. A method for performing interaction in a chessboard interface, comprising:
    at a computing device having one or more processors and memory storing programs executed by the one or more processors,
    detecting an operation of triggering a chessboard interface to select an interaction area;
    locating a square in which the operation is located;
    determining a first movement amount of the square, the first movement amount being associated with movement operations of a user performed on squares in the chessboard interface;
    wherein the first movement amount is initial movement amount, obtaining, through calculation according to coordinates corresponding to the square and a magnification factor, initial movement amount corresponding to the square;
    magnifying the chessboard interface according to the initial movement amount; and
    detecting the movement operations of the user on the square in the magnified chessboard interface, perform, according to the movement operations, an adjustment on the magnified chessboard interface, and modifying the first movement amount according to the movement operations.

2. The method according to claim 1, wherein the locating a square in which the chess piece placing operation is located comprises:
    acquiring a location at which the operation of triggering the chessboard interface to select the interaction area is located;
    obtaining, through calculation according to a height and a width of the square by using a determined location in the chessboard interface as a basis point, the quantity of squares between the location at which the operation is located and the determined location; and
    locating, in the chessboard interface according to the quantity of the squares, the square in which the operation is located.

3. The method according to claim 1, wherein the step of detecting the movement operations of the user on the square in the magnified chessboard interface, performing, according to the movement operations, an adjustment on the magnified chessboard interface, and modifying the first movement amount according to the movement operations comprises:
    detecting the movement operations of the user on the square in the chessboard interface magnified according to the initial movement amount, so as to obtain, according to the movement operations, a second movement amount for adjusting the square by the user;
    moving, according to the second movement amount for adjusting the square by the user, the chessboard interface magnified according to the initial movement amount; and
    updating the first movement amount to be a sum of the initial movement amount and the second movement amount for adjusting the square by the user.

4. The method according to claim 1, wherein the first movement amount is a movement amount obtained through a last modification, and the step of magnifying the chessboard interface according to the first movement amount comprises:
    acquiring the first movement amount obtained through the last modification; and
    magnifying the chessboard interface according to the first movement amount obtained through the last modification.

5. The method according to claim 4, wherein the step of detecting the movement operations of the user on the square in a magnified chessboard interface, performing, according to the movement operations, an adjustment on the magnified chessboard interface, and modifying the first movement amount according to the movement operations comprises:
    detecting the movement operations of the user on the square in the chessboard interface magnified according to the first movement amount obtained through the last modification, so as to obtain, according to the movement operations, the second movement amount for adjusting the square by the user; and
    performing, by using, as an initial value, the first movement amount obtained through the last modification, iterative calculation according to the currently obtained second movement amount for adjusting the square by the user, and obtaining corresponding updated first movement amount for the square currently triggered by the user.

6. The method according to claim 1, further comprising:
    recovering the magnified chessboard interface once the operation of triggering the chessboard interface is completed.

7. An apparatus for performing interaction in a chessboard interface, comprising computer-implemented instructions that are stored in a memory of a computing device and executed by one or more processors of the computing device, the one or more processors being configured to:
    detect an operation of triggering a chessboard interface to select an interaction area;
    locate a square in which the operation is located;
    determine a first movement amount of the square, the first movement amount being associated with movement operations of a user on squares in the chessboard interface;
    wherein the first movement amount is initial movement amount, obtain, through calculation according to coordinates corresponding to the square and a magnification factor, initial movement amount corresponding to the square;

magnify the chessboard interface according to the initial movement amount; and detect the movement operations of the user on the square in the magnified chessboard interface, perform, according to the movement operations, an adjustment on the magnified chessboard interface, and modify the first movement amount according to the movement operations.

8. The apparatus according to claim 7, wherein the one or more processors are further configured to:
acquire a location at which the operation of triggering the chessboard interface to select the interaction area is located;
obtain, through calculation according to a height and a width of the square by using a determined location in the chessboard interface as a basis point, the quantity of squares between the location at which the operation is located and the determined location; and
locate, in the chessboard interface according to the quantity of the squares, the square in which the operation is located.

9. The apparatus according to claim 7, wherein the one or more processor are further configured to:
detect the movement operations of the user on the square in the chessboard interface magnified according to the initial movement amount, so as to obtain, according to the movement operations, a second movement amount for adjusting the square by the user;
move, according to the second movement amount for adjusting the square by the user, the chessboard interface magnified according to the initial movement amount; and
update, the first movement to be a sum of the initial movement amount and the second movement amount for adjusting the square by the user.

10. The apparatus according to claim 7, wherein the first movement amount is a movement amount obtained through a last modification, and the one or more processor are further configured to:
acquire the first movement amount obtained through the last modification; and
magnify the chessboard interface according to the first movement amount obtained through the last modification.

11. The apparatus according to claim 10, wherein the one or more processor are further configured to:
detect the movement operations of the user on the square in the chessboard interface magnified according to the first movement amount obtained through a last modification, so as to obtain, according to the movement operations, the second movement amount for adjusting the square by the user; and
perform, by using, as an initial value, the first movement amount obtained through the last modification, iterative calculation according to the currently obtained second movement amount for adjusting the square by the user, and obtain corresponding updated first movement amount for the square currently triggered by the user.

12. The apparatus according to claim 7, wherein the one or more processor are further configured to:
recover the magnified chessboard interface once the operation of triggering the chessboard interface is completed.

13. A non-transitory computer readable storage medium having stored therein one or more instructions, which, when being executed by a computing device, cause the computing device to:
detecting an operation of triggering a chessboard interface to select an interaction area;
locating a square in which the operation is located;
determining a first movement amount of the square, the first movement amount being associated with movement operations of a user performed on squares in the chessboard interface;
wherein the first movement amount is initial movement amount, obtaining, through calculation according to coordinates corresponding to the square and a magnification factor, initial movement amount corresponding to the square;
magnifying the chessboard interface according to the initial movement amount; and
detecting the movement operations of the user on the square in the magnified chessboard interface, perform, according to the movement operations, an adjustment on the magnified chessboard interface, and modifying the first movement amount according to the movement operations.

* * * * *